Figure 1:
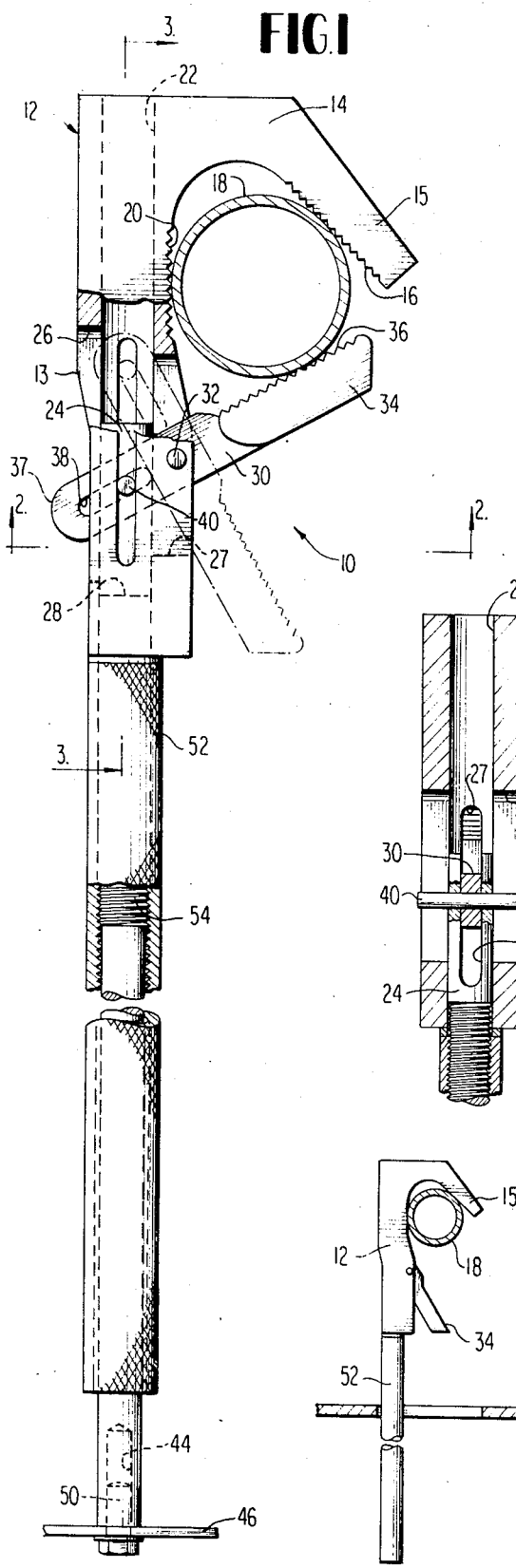

United States Patent [19]
Auerbach

[11] 3,784,140
[45] Jan. 8, 1974

[54] REMOTE FASTENER FOR LAMPS AND THE LIKE

[76] Inventor: Sherwin Leonard Auerbach, 473 Vallejo St., San Francisco, Calif. 94133

[22] Filed: Sept. 1, 1972

[21] Appl. No.: 285,929

[52] U.S. Cl............. 248/214, 248/226 C, 248/230
[51] Int. Cl............................................. F16m 13/02
[58] Field of Search..................... 248/72, 214, 215, 248/226 C, 228, 230

[56] References Cited
UNITED STATES PATENTS

| | | | |
|---|---|---|---|
| 1,299,003 | 4/1919 | Morris et al. | 248/226 C X |
| 1,754,929 | 4/1930 | Atticks et al. | 248/230 |
| 2,408,719 | 10/1946 | Abernethy | 248/72 X |
| 2,926,880 | 3/1960 | Bourgeois | 248/228 X |

Primary Examiner—William H. Schultz
Attorney—Robert E. Leblanc et al.

[57] ABSTRACT

The fastener includes a head carrying a clamping jaw and an opening in which a rod is slidably received. Registering slots on the head and rod receive one end of a locking lever which is pivotally connected to the head. The opposite end of the lever carries a clamping jaw. A pin is carried by the rod and engages in a slot on the one lever end whereby reciprocating movement of the rod moves the jaw carried by the lever toward and away from the fixed clamping jaw. To retain the fastener clamped about a support, a locking sleeve is threaded on the rod. By threading the sleeve into butting engagement against the head the jaw carried by the lever is maintained in engagement against the support. The opposite end of the rod pivotally mounts a lighting fixture or the like.

12 Claims, 6 Drawing Figures

PATENTED JAN 8 1973 3,784,140

REMOTE FASTENER FOR LAMPS AND THE LIKE

The present invention relates to a remote fastener for lamps and the like and particularly relates to a fastener for securing lamps to supports which are remote or inaccessible or otherwise not readily available.

In television studios, theaters, stages and the like, lamps, spotlights, etc. are frequently moved about and disposed in various locations to achieve proper lighting effects. Usually, such lamps are hung from overhead supports in order to maintain the floor area clear of lighting and ancillary equipment and also to provide proper lighting. The lamps are very often mounted on pipe supports forming a part of a ceiling structure overlying the stage. The maze of various pipe supports and wires associated with the lighting equipment has rendered connection of the lamps to the supports and their proper placement at best very difficult. Many conventional fasteners for securing lamps to pipe supports require the use of one or more tools, for example, a wrench. The use of a fastener requiring a wrench, however, renders final securement of the fastener and lamp to the support even more difficult particularly in areas not readily accessible or in areas in which manipulation of the tool is inhibited by other supports, wiring and the like. Further, quick connect to and disconnect from the pipe supports is all but virtually impossible with conventional lighting fasteners and this renders the positioning and final securement of the lighting very difficult and time consuming.

The present remote fastener minimizes and/or eliminates the foregoing and other problems associated with prior fasteners for lamps and the like and provides a novel and improved remote fastener for lamps having various advantages in construction and use in comparison with such prior fasteners. Particularly, the present invention provides a remote fastener for lamps which can be secured to pipes or other supports without the aid of ancillary tools and also to a wide variety of sizes of pipe or other supports and particularly those overhead pipe supports conventionally utilized in theaters and the like. More particularly, the present invention provides a fastening head carrying a clamping jaw at one end and having an opening at its remote end for receiving one end of an actuating rod. The head pivotably carries a locking lever which has a clamping jaw at one end. The rod and head have registering slots which receive the other end of the locking lever. The locking lever, in turn, has a slot which receives a pin extending through the slotted actuating rod and through guide slots in the opposite sides of the clamping head. Thus, reciprocating movement of the actuating rod serves to pivot the movable clamping jaw carried by the lever toward and away from the fixed clamping jaw carried by the head, i.e., between a position wherein the jaws are clamped about a pipe support and a position wherein the jaws are open.

To retain the movable clamping jaw in the clamped position, the end of the actuating rod which extends from the clamping head is externally threaded and threadedly receives a locking sleeve. By first threading the end of the locking sleeve to space it from the end of the head and then displacing the rod and sleeve jointly toward the head, the jaws are located in the full open position of the clamp whereby the clamping head can be received about a support, for example, a pipe support. By displacing the actuating rod and the locking sleeve carried thereby away from the head, the locking lever is pivoted such that its locking jaw engages the pipe support whereby the latter is clamped between the movable and fixed clamping jaws of the lever and head respectively. The sleeve is then threaded about the actuating rod such that its end butts the end of the clamp head. This prevents the locking jaw carried by the lever from pivoting away from the support.

The locking sleeve extends substantially the full length of the actuating rod. In this manner, the lamp carried at the end of the actuating rod can be fastened to a pipe support remote from the lamp from a location adjacent the lamp since the end of the locking sleeve is readily accessible adjacent the lamp. Consequently, the lamp can be secured to a remotely located pipe support since the fastener can be manipulated from the lamp end thereof to engage the clamp head and locking lever about the pipe support. Further, the clamping action is effected simply by rotating the locking sleeve without the aid of tools and, as noted previously, this can be accomplished at the lamp end of the fastener.

Accordingly, it is a primary object of the present invention to provide a novel and improved remote fastener for lamps and the like.

It is another object of the present invention to provide a novel and improved remote fastener for lamps and the like wherein the fastener can be readily and easily applied about supports which are remote from the final location of the lamp and/or not readily accessible.

It is still another object of the present invention to provide a novel and improved remote fastener for lamps and the like which does not require one or more tools of any kind to secure the lamp to the support and which securement does not interfere with the mounting of the lamp or the electrical connections therefor.

It is a further object of the present invention to provide a novel and improved remote fastener for lamps and the like which is simple and inexpensive to construct.

Figure 2:
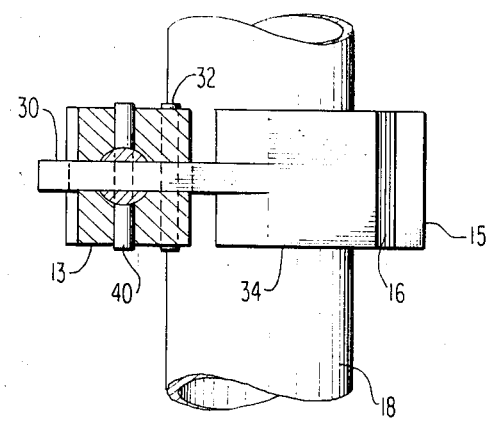
Figure 3:
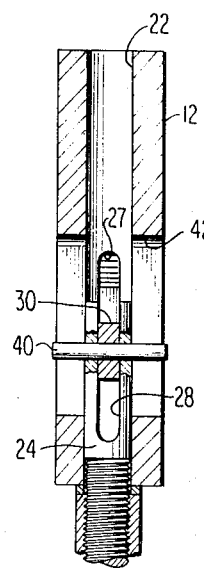
Figure 5:
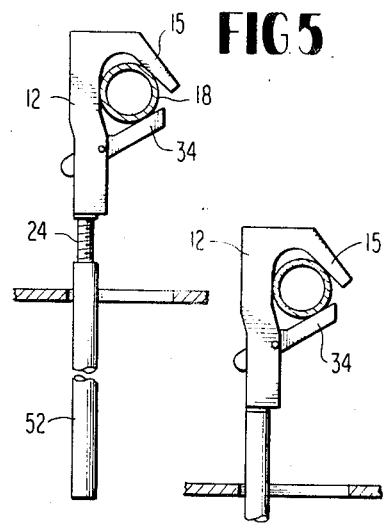
Figure 4:
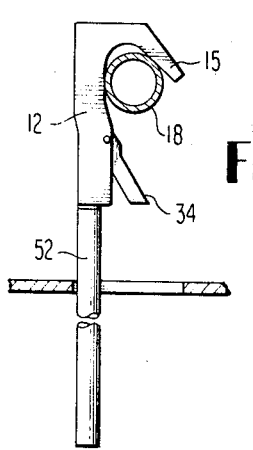
Figure 6:
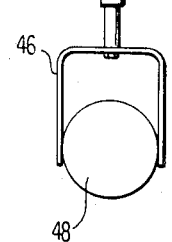

These and further objects of the present invention will become more apparent upon reference to the following specification, claims and drawings wherein:

FIG. 1 is a side elevational view of a remote fastener for lamps and the like with parts broken out in cross section for ease of illustration;

FIGS. 2 and 3 are fragmentary cross-sectional views thereof taken about on lines 2—2 and 3—3 in FIG. 1 respectively; and FIGS. 4, 5 and 6 are schematic views illustrating a manner of applying the remote fastener and lamp to a pipe support.

Referring to the drawings, and particularly to FIG. 1, there is illustrated a remote fastener for lamps and the like constructed in accordance with the present invention and generally indicated 10. Fastener 10 includes a head 12 in the general shape of an inverted J comprised of an elongated body portion 13 and an outwardly projecting leg 14. Leg 14 carries an inclined clamping jaw 15 having a roughened inner surface 16 for engagement with a support 18, a pipe support being illustrated herein. A surface 20 on the inside of body portion 13 and in general opposition to surface 16 also has a roughened surface for engaging about support 18. Head 12 also includes an opening or bore 22 through body portion 13 which at the end thereof remote from jaw 14 slidably receives one end of an actuating rod 24. Slots 26 and 27 are provided in body portion 13 on diametrically opposed sides of bore 22 and a slot 28 is provided in the end of actuating rod 24 in registry with slots 26 and 27.

A locking lever 30 is pivotably mounted about a pin 32 secured to head 12, pin 32 extending across slot 27. One end of locking lever 30 comprises a jaw 34 having a roughened surface 36 for engaging about pipe support 18. The end 37 of lever 30 remote from jaw 34 is received in the registering slots 26 and 27 of the head 12 and in the slot 28 in the actuating rod 24. Lever end 37 has an elongated slot 38 which engages about a pin 40 carried by actuating rod 24 and which pin extends across slot 28 at a location intermediate its length. Opposite ends of pin 40 engage in diametrically opposed guide slots 42 on opposite sides of head 12. It will be appreciated that, with the foregoing construction, reciprocating movement of rod 24 toward and away from head 12 pivots locking lever 30 about pin 32 in opposite directions. That is, and as more particularly described hereinafter, locking lever 30 is pivoted into the full line locking position illustrated in FIG. 1 in response to displacement of rod 24 away from head 12 and an open position illustrated by the dashed lines in FIG. 1 in response to displacement of rod 24 toward head 12.

Actuating rod 24 extends from head 12 and terminates at its remote end in a tapped opening 44. A generally U-shaped bracket 46 pivotably mounts a lamp 48 (FIG. 6) between its spaced ends and is secured to the end of rod 24 by a bolt 50 which extends through bracket 46 and into the tapped opening 44. The bracket is, of course, pivotable about the axis of rod 24 while the lamp per se is pivotable about an axis normal thereto whereby the lamp can be oriented universally as desired.

To releasably lock the locking lever 30 in a position clamping the fastener about pipe support 18, an internally threaded locking sleeve 52 is provided about the portion of actuating rod 24 which extends from head 12. The locking sleeve 52 is slightly shorter in length than the portion of rod 24 which extends from head 12 for reasons that will become apparent, the sleeve extending to a location adjacent lamp bracket 46. A portion of the actuating rod 24 is externally threaded at 54 and it will be appreciated that rotation of locking sleeve 52 about rod 24 displaces sleeve 52 along rod 24 toward or away from head 12.

To utilize the fastener hereof, locking sleeve 52 is threaded about rod 24 in a direction tending to displace it away from head 12. The sleeve 52 and actuating rod 24 are then jointly displaced toward head 12. It will be appreciated that upward movement of rod 24 toward head 12 as illustrated in FIG. 1 carries pin 40 therewith and hence pivots locking lever 30 about pin 32 to locate jaw 34 in a position fully spaced from jaw 14 as illustrated in FIG. 4. It will be noted that, in most studios, stages and the like, lamp 48 will be supported from an overhead support and that by threading sleeve 52 about rod 24 away from head 12, the fastener can be held by sleeve 52 or rod 24 at the end of the fastener adjacent lamp 48 with the head 12 sliding along rod 24 by its own weight to open the locking jaws. This is particularly significant in those locations wherein the support is inaccessible. Once the inverted J-shaped head 12 is hooked over a support 18 as illustrated in FIG. 4, rod 24 is displaced in a direction away from head 12 by simply pulling it or pulling locking sleeve 52. Displacement of rod 24 away from head 12 and in a downward direction as illustrated in FIG. 1, pivots locking lever 30 into the position illustrated in FIG. 5 with surfaces 16, 20 and 36 in engagement about support 18.

While the weight of the lamp, rod and sleeve would be sufficient to hold the fastener clamped about support 18, i.e., would be sufficient to maintain locking lever 30 in the full line position as illustrated in FIG. 1, it is preferable to lock the fastener to the support. To this end, locking sleeve 52 is threaded about rod 24 in a direction such that it butts the margin 56 about opening 22 of head 12. Note that this threading action may be accomplished at a location adjacent the lamp end of the fastener. Thus, when sleeve 52 is threaded about rod 24 into butting engagement with head 12, any tendency of the locking lever 30 to pivot in a direction to unlock the support from the fastener is prevented.

Thus, it will be appreciated that the objects of the present invention are fully accomplished by the foregoing described fastener in that it can be readily and easily applied to a support from a location remote from the support and without the aid of tools. Furthermore, it will be noted that the fastener is formed of readily available materials, easily and inexpensively machined to their final configuration, and readily and easily assembled.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for releasably coupling a fixture to a support comprising:
    a head including a body carrying a clamping jaw and having an opening,
    a rod having an end portion slidably received in said opening,
    a lever pivotally carried by said head and carrying a clamping jaw at one end thereof in opposition to said first mentioned jaw,
    means for pivotally connecting said lever and said rod end portion on the side of the pivotal axis of said lever opposite its jaw whereby movement of said rod away from said head pivots the jaw carried by said lever toward said first mentioned jaw for clamping the support between said jaws, means cooperable between said rod and said head for locking the jaw carried by said lever against pivotal movement in a direction away from said first mentioned jaw,
    and means carried by one of said rod and said locking means for securing a fixture thereto.

2. Apparatus according to claim 1, wherein said locking means includes an internally threaded sleeve, at least a portion of said rod being externally threaded, said sleeve being threadedly received about said rod and threadable thereon into a position butting said head to clamp said jaws about the support.

3. Apparatus according to claim 1, wherein said securing means is carried by said rod.

4. Apparatus according to claim 1, wherein said body is elongated and has a slot for receiving the opposite end of said lever, said rod end portion having a slot in registry with the first mentioned slot in said body for receiving said opposite lever end, said opposite lever end having a slot, guides carried by said body and a pin engaging in the guides and through the slot in said opposite lever end for pivoting said lever in response to reciprocating movement of the rod relative to said head.

5. Apparatus according to claim 4, wherein said guides include a pair of slots opening through the side of said body for receiving the opposite ends of said pin.

6. Apparatus according to claim 1, wherein said body is elongated and said jaw includes portions forming an acute angle one with the other with each portion having a surface for engaging the support, the jaw carried by said lever having a surface for engaging said support and generally opposite said first mentioned surface portions whereby the apparatus is adapted to be clamped to the support by a three-point contact.

7. Apparatus according to claim 6, wherein said surfaces are roughened for gripping the support.

8. Apparatus according to claim 6, wherein the surface carried by said lever lies generally normal to a line bisecting the acute angle between said first mentioned surface portions.

9. Apparatus according to claim 1, wherein said locking means includes a member movable lengthwise along said rod into and out of engagement with marginal portions of said body about said opening, said securing means being carried by said rod.

10. Apparatus according to claim 1, wherein said locking means includes an internally threaded sleeve, at least a portion of said rod being externally threaded, said sleeve being threadedly received about said rod with an end of said sleeve being adapted for butting engagement with said head to clamp said jaws about the support, said body being elongated and having a slot for receiving the opposite end of said lever, said body also including a pair of guide slots opening through the opposite sides thereof, said rod end portion also having a slot in registry with the first mentioned slot in said body for receiving said opposite lever end, said opposite lever end having a slot, a pin carried by said rod and engaging in the pair of guide slots in said body and through the slot in said lever end for pivoting said lever in response to reciprocating movement of the rod relative to said head.

11. Apparatus according to claim 10, wherein said body is elongated and said jaw includes portions forming an acute angle one with the other with each portion having a surface for engaging the support, the jaw carried by said lever having a surface for engaging said support and generally opposite both of said first mentioned surface portions whereby the apparatus is adapted to be clamped to the support by a three-point contact.

12. Apparatus according to claim 1, including a lamp carried by said rod, and means for pivotally connecting said lamp and said rod.

* * * * *